(12) United States Patent
Milicevic et al.

(10) Patent No.: US 8,667,816 B2
(45) Date of Patent: Mar. 11, 2014

(54) METHOD FOR MANUFACTURING A PRIMARY PREFORM

(75) Inventors: Igor Milicevic, Helmond (NL); Mattheus Jacobus Nicolaas Van Stralen, Tilburg (NL); Eugen Aldea, Eindhoven (NL)

(73) Assignee: Draka Comteq B.V., Amsterdam (NL)

( * ) Notice: Subject to any disclaimer, the term of this patent is extended or adjusted under 35 U.S.C. 154(b) by 162 days.

(21) Appl. No.: 13/150,859

(22) Filed: Jun. 1, 2011

(65) Prior Publication Data
US 2011/0302966 A1    Dec. 15, 2011

(30) Foreign Application Priority Data
Jun. 11, 2010 (NL) ..................................... 2004874

(51) Int. Cl.
*C03B 37/012* (2006.01)
(52) U.S. Cl.
USPC .................. 65/391; 65/417; 65/425; 65/426; 65/436
(58) Field of Classification Search
None
See application file for complete search history.

(56) References Cited

U.S. PATENT DOCUMENTS

| | | | |
|---|---|---|---|
| 4,125,389 A * | 11/1978 | King ................................ 65/391 |
| 4,207,834 A | 6/1980 | Canteloup et al. |
| 4,257,797 A * | 3/1981 | Andrejco et al. ................ 65/417 |
| 4,263,032 A * | 4/1981 | Sinclair et al. .................. 65/420 |
| 4,493,721 A | 1/1985 | Auwerda et al. |
| 4,675,038 A | 6/1987 | Ainslie et al. |
| 4,714,589 A * | 12/1987 | Auwerda et al. ............... 427/573 |
| 4,741,747 A | 5/1988 | Geittner et al. |
| 4,816,050 A * | 3/1989 | Roba ................................ 65/382 |
| 4,844,007 A | 7/1989 | Eikelboom |
| 4,877,938 A | 10/1989 | Rau et al. |
| 5,242,476 A | 9/1993 | Bartel et al. |
| 5,803,974 A * | 9/1998 | Mikoshiba et al. ..... 118/723 MP |
| 5,838,866 A | 11/1998 | Antos et al. |
| 6,122,935 A * | 9/2000 | Glodis et al. .................... 65/384 |
| 6,260,510 B1 | 7/2001 | Breuls et al. |
| 2003/0159781 A1 | 8/2003 | Van Stralen et al. |
| 2004/0121247 A1* | 6/2004 | Berkey et al. ..................... 430/5 |

(Continued)

FOREIGN PATENT DOCUMENTS

| | | |
|---|---|---|
| DE | 3206175 A1 | 8/1983 |
| DE | 3222189 A1 | 1/1984 |

(Continued)

OTHER PUBLICATIONS

Kuppers et al., "Deposition of Fluorine-Doped Silica Layers from a SiCl4/SiF4/O2 Gas Mixture by the Plasma-CVD Method", J. Electrochem. Soc. vol. 125 No. 8, Aug. 1978.*

(Continued)

*Primary Examiner* — Matthew Daniels
*Assistant Examiner* — Lisa Herring
(74) *Attorney, Agent, or Firm* — Shumaker, Loop & Kendrick, LLP

(57) ABSTRACT

The present invention relates to a method for manufacturing a primary preform for optical fibers, using an internal vapor deposition process, wherein a gas flow of doped undoped glass-forming gases is supplied to the interior of a hollow substrate tube having a supply side and a discharge side via the supply side thereof, wherein deposition of glass layers on the interior of the substrate tube is effected as a result of the presence of a reaction zone.

11 Claims, 2 Drawing Sheets

(56) References Cited

U.S. PATENT DOCUMENTS

| | | |
|---|---|---|
| 2005/0000253 A1 | 1/2005 | Xie et al. |
| 2005/0041943 A1 | 2/2005 | Milicevic et al. |
| 2005/0120751 A1 | 6/2005 | Simons et al. |
| 2005/0172902 A1 | 8/2005 | Van Stralen et al. |
| 2006/0130530 A1 | 6/2006 | Anderson et al. |
| 2007/0062222 A1 | 3/2007 | Janka et al. |
| 2007/0289532 A1 | 12/2007 | Hartsuiker et al. |
| 2008/0031582 A1* | 2/2008 | Gonnet et al. ............... 385/127 |
| 2008/0044150 A1 | 2/2008 | Terpsma et al. |
| 2008/0053812 A1 | 3/2008 | Higashitani et al. |
| 2009/0126407 A1* | 5/2009 | Bookbinder et al. ........... 65/391 |

FOREIGN PATENT DOCUMENTS

| | | |
|---|---|---|
| EP | 0127227 A2 | 12/1984 |
| GB | 2117754 A | 10/1983 |
| JP | 57047735 A * | 3/1982 |
| WO | WO03/097542 A1 | 11/2003 |

OTHER PUBLICATIONS

JP57-047735 English Translation by FLS, Inc., Apr. 2013.*

Sep. 5, 2011 European Search Report issued in European Patent Application No. EP 11 16 8941.

* cited by examiner

METHOD FOR MANUFACTURING A PRIMARY PREFORM

The present invention relates to a method for manufacturing a primary preform for optical fibres, using an internal vapour deposition process, wherein a gas flow of doped and/or undoped glass-forming gases is supplied to the interior of a hollow substrate tube having a supply side and a discharge side and being surrounded by a furnace, via the supply side thereof, wherein deposition of glass layers on the interior of the substrate tube is effected as a result of the presence of a reaction zone.

According the method as described in the introduction for manufacturing such a preform rod, an elongated vitreous substrate tube (for example made of quartz) is coated with layers of doped or undoped silica (for example germanium-doped silica) on the interior cylindrical surface thereof. The term "silica" as used herein is to be understood to mean any substance in the form of $SiO_x$, whether or not stoichiometric, and whether or not crystalline or amorphous. This can be effected by positioning the substrate tube along the cylindrical axis of the resonance cavity, and flushing the interior of the tube with a gaseous mixture comprising $O_2$, $SiCl_4$ and $GeCl_2$ (for example). A localised plasma is generated, using a resonance space surrounding the substrate tube, causing the reaction of Si, O and Ge so as to thus effect direct deposition of, for example, Ge-doped $SiO_x$ on the interior surface of the substrate tube. Since such a deposition only occurs in the vicinity of the localised plasma, the resonant cavity (and thus the plasma) must be swept along the cylindrical axis of the tube in order to uniformly deposit the tube along the entire length thereof. When deposition is complete, the tube is possibly subjected to a thermal collapsing treatment so as to form a rod having a Ge-doped silica core portion and a surrounding undoped silica cladding portion. If an extremity of the rod is heated so that it becomes molten, a thin glass fibre can be drawn from the rod and be wound on a reel; said fibre then has a core portion and a cladding portion corresponding to those of the rod. Because the Ge-doped core has a higher refractive index than the undoped cladding, the fibre can function as a waveguide, for example for use in propagating of optical telecommunication signals. It should be noted that the gaseous mixture flowing through the substrate tube may also contain other components; the addition of $C_2F_6$, for example, leads to a reduction in the refractive index value of the doped silica. It should also be noted that the preform rod may be externally coated with an additional glass layer, for example by applying silica to the preform rod, using a deposition process, in a so-called jacket tube (comprised of undoped silica) prior to the drawing procedure, so as to thus increase the amount of undoped silica relative to the amount of doped silica in the final fibre.

The use of such an optical fibre for telecommunication purposes requires that the optical fibre be substantially free from defects (for example discrepancies in the percentage of dopants, undesirable cross-sectional ellipticity and the like), because, when considered over a large length of the optical fibre, such defects may cause a significant attenuation of the signal being transported. It is important, therefore, to realise a very uniform process, because it is the quality of the deposited layers that will eventually determine the quality of the fibres.

The deposition of glass layers on the interior of a substrate tube, wherein one or more reactive gases and an oxygen-containing gas are supplied to the substrate tube, is known per se, for example from U.S. Pat. No. 6,260,510 in the name of the present applicant. According to the method that is known therefrom, the interior surface of a substrate tube, for example consisting of quartz glass, is coated with layers of doped or undoped silica (for example germanium-doped silica).

German Offenlegungsschrift DE 32 22 189 relates to an apparatus for manufacturing a preform in which a 35-GHz microwave interferometer is used for monitoring the front of the plasma inside the substrate tube. On basis of this monitoring the microwave power inside the substrate tube is controlled. The plasma used is not a plasma that can be moved back-and-forth in the tube.

U.S. Pat. No. 4,714,589 relates to a method of coating the inside of a tube with a material by reactive deposition in which for compensating for radiation losses at the tube ends an additional heat source is provided between a heat reflector and the tube.

U.S. Pat. No. 4,493,721 relates to a method of manufacturing optical fibres in which the inner wall of a tube is etched with a fluorine compound before core glass is deposited on the etched inner wall of the tube.

German Offenlegungsschrift DE 32 06 175 further discloses a method for manufacturing a preform for optical fibres, wherein the hollow substrate tube is partially surrounded by a furnace, which substrate tube is additionally surrounded by a pre-heating furnace upstream thereof, seen in the direction of the gas supply. Both furnaces can be moved simultaneously along the length of the substrate tube during the deposition process, whilst a constant spacing is maintained between the two furnaces, seen in the longitudinal direction of the substrate tube.

The chloride compounds, in particular silica tetra chloride and germanium tetra chloride, which are used as starting materials in the manufacture of glass fibres, are generally slightly contaminated with small amounts of silanes, such as trichloromethyl silane ($SiCl_3$)$CH_3$)), $SiHCl_3$ and the like. During the above-discussed chemical vapour deposition process, the hydrogen atoms can thus form —OH-compounds in the glass layers deposited on the interior of the substrate tube, which OH-compounds have a strongly adverse effect on the transmission spectrum of a fibre drawn from an optical preform, in particular due to the strong absorption thereof at 1385 nm. Such absorption losses caused by the small amount of contaminations in the gaseous starting materials may amount to 10-20 dB/km at a wavelength of 1385 nm. Although methods are known in the prior art to prevent the incorporation of such —OH-groups in the optical glass fibre, for example by carrying out a chlorine treatment after deposition in the case of porous glass structures, as is known from U.S. Pat. No. 4,675,038, or by adding fluorine during the chemical vapour deposition reaction, for example, as known from European patent application No. 0 127 227, both prior art methods have the drawback that an additional amount of chlorine or fluorine, respectively, finds its way into the final glass structure, as a result of which the attenuation losses caused by Rayleigh scattering will increase.

Optical fibres comprising a cladding layer and a light-conducting core are generally known, they are mainly used in the field of telecommunication. See for example European patent application No. 0 127 227, U.S. Pat. Nos. 5,242,476 and 5,838,866. Because of their typically small attenuation and dispersion, such optical fibres are in particular suitable for forming long-distance data links, which links frequently bridge several thousand kilometers. When such large distances are to be bridged, it is essential that the cumulative signal losses in the optical fibre be minimised if transmission of optical signals is to be effected while using a small number of intermediate amplification stations. The telecommunication industry generally requires that the total attenuation in such optical fibres not exceed a value of 0.25 dB/km, preferably not exceed a value of 0.2 dB/km, at the usual transmission wavelength of 1550 nm.

The present inventors have found that the attenuation in optical glass fibres is generally caused by Rayleigh scattering, absorption and bending. The aforesaid absorption is generally attributed to a contamination in the glass, with water, in particular OH-group, being considered to be the most important factor in this regard. The OH-group causes a peak, the so-called water peak, in the optical spectrum around a wavelength of 1385 nm. A measure that can be applied for minimising the negative influence of water during the internal vapour deposition process is, for example, carrying out the deposition process in an air-conditioned environment, viz. an environment with a reduced air humidity.

The object of the present invention is thus to provide a method for manufacturing a primary preform for optical fibres, wherein the attenuation in optical fibres obtained from such a primary preform is minimised.

Another object of the present invention is to provide a method for manufacturing a primary preform for optical fibres, wherein the attenuation to be attributed to the presence of the OH-group, in particular in the optical spectrum around 1385 nm, is minimised.

The present invention is characterised in that the gas flow is subjected to a pre-treatment prior to being supplied to entry in the interior of the hollow glass substrate tube.

The present inventors have in particular found that pre-treating the gas flow before said gas flow is supplied to the hollow glass substrate tube has an advantageous effect as regards the reduction of the negative influence of the OH-group in the optical spectrum, thereby achieving one or more of the aforesaid objects. The term "pre-treatment" is to be understood to mean a treatment that takes place before the gas flow enters the hollow glass tube. Such a pre-treatment usually takes place outside the furnace that surrounds the hollow glass tube, so that the pre-treatment takes place at a location that is also physically separated from the furnace space. It will be understood that the gas flow will experience a slight temperature increase upon being introduced into the furnace toward the interior of the glass tube, but this cannot be regarded to constitute the present pre-treatment. In addition, a step of mixing several gas flows together does not constitute a pre-treatment according to the present invention.

The pre-treatment is a kind of an activation of the gas flow and is in particular selected from the group of pre-heating and pre-plasma, or a combination thereof, with the reaction zone used in the interior deposition process preferably being of the plasma type. The present invention reads on a process in which the reactants are subjected to a specific pre-treatment, for example a pre-plasma treatment prior to entry in the substrate tube. The term "combination" is to be understood to mean that the pre-treatment may comprise both pre-plasma and pre-heating, in a desired order. The term "pre-plasma" has been selected in particular to prevent confusion with the plasma that is used for the deposition of glass layers in the interior of the hollow substrate tube. The generation of pre-plasma can take place by means of microwaves, but also via electrical and/or magnetic fields, with microwaves being preferred.

The present inventors assume that such a pre-treatment will already condition the starting materials to be supplied to the hollow substrate tube such that an abrupt transition between the physical condition of starting materials, viz. the gas flow, and the conditions prevailing in the hollow substrate tube will be smoothed out somewhat. More in particular, the present inventors assume that a fluorine-containing compound that has been subjected to the present pre-treatment will efficiently react in the interior of the hollow substrate tube with the hydrogen present therein so as to form very stable HF compounds, so that the possible incorporation of harmful OH-groups in the deposited glass is minimised.

It is in particular desirable that the power level used in the pre-plasma is lower than the power level used in the reaction zone of the plasma type so as to thus minimise premature deposition of glass layers during the pre-treatment. The power level to be used must be sufficiently high for obtaining and maintaining a plasma.

In a special embodiment it is desirable with a view to achieving a constant radial refractive index profile for a maximum part of the length of the final preform that the power level of the pre-treatment of the pre-plasma type be set in dependence on the position of the reaction zone on the hollow glass substrate tube, in particular that the power level used in the pre-treatment of the pre-plasma type be set in dependence on the period of the deposition process. In an embodiment according to the present invention it is possible to use the pre-treatment only during a certain period of the inside deposition process, for example in dependence on the composition of the gas flow to be supplied to the interior of the hollow quartz substrate tube, i.e. the main gas flow and one or more secondary gas flows.

The plasma and the pre-plasma are preferably generated by using microwaves, whilst in a special embodiment it may be preferable, however, to effect such conditions by using RF.

The present inventors have further found that it is in particular preferable to use of fluorine-containing compound free from hydrogen atoms as a dopant in the present method, wherein such a compound is preferably selected from the group consisting of $CF_4$, $C_2F_6$, $C_4F_8$, $CCl_2F_2$, $SiF_4$, $Si_2F_6$, $SF_6$, $NF_3$, $F_2$ or a mixture thereof. Such a fluorine compound will react with the hydrogen that may be present to form HF, which compound can be regarded as a very stable molecule. The presence of fluorine thus results in the removal of hydrogen atoms from the plasma, so that hydrogen can no longer bind with oxygen, thereby minimising the incorporation in the glass layers of OH-groups that adversely affect the attenuation. According to the present invention combinations of dopants can be used, i.e. refractive index increasing dopants and refractive index decreasing dopants. To prevent any precipitation or deposition of carboniferous compounds in the pre-treatment space, it is desirable that the fluorine-containing compounds be supplied together with oxygen as a carrier gas. In addition to that it is desirable that the pre-treatment of the chlorine-containing compounds, in particular $SiCl_4$ en $GeCl_4$, takes place in the absence of oxygen, so as to thus prevent undesirable premature deposition of vitreous layers in the pre-treatment space and the network of conduits connected thereto.

The present inventors have furthermore found that fluorine is incorporated in glass layers in an efficient manner. The presence of fluorine is known to lead to a reduction of the refractive index value, which reduction is generally undesirable. In order to thus compensate for a lower refractive index, it is desirable to incorporate a refractive index-increasing dopant, in particular germanium. A negative side-effect of such an application is the increased attenuation. The present inventors therefore aim at reducing the amount of fluorine used for the removal of hydrogen from the plasma, in particular by subjecting the gas flow to a pre-treatment.

The method described in the introduction is in particular suitable for carrying out the so-called PCVD (Plasma Chemical Vapour Deposition) process, in which such temperature and plasma conditions are created in the interior of the hollow glass substrate tube that deposition of glass layers takes place on the inner side of the hallow substrate tube. In such a PCVD process, the reaction zone is moved back and forth along the length of the hollow substrate tube, in particular by means of the resonator, between a reversal point near the supply side and a reversal point near the discharge side of the hollow substrate tube. The resonator preferably surrounds the hollow glass substrate tube, and plasma conditions are created via the reaction zone, which plasma conditions, combined with the furnace temperature, result in the deposition of glass layers on the interior of the hollow glass substrate tube.

If the pre-treatment used in the present method comprises pre-heating, said pre-heating is preferably carried out from a temperature of 800° C. to a temperature prevailing in the furnace, in which furnace the temperature is of at most about 1400° C.

The invention further relates to a device for manufacturing a glass preform for optical fibres, comprising usual means for placing the hollow substrate tube between a gas supply unit and a gas discharge unit, means for supplying gases and means for discharging gases, means for heating the substrate tube, in particular a furnace, and means for forming a reaction zone, in particular a resonator, wherein a device for carrying out a pre-treatment is positioned upstream, seen in the direction of the gas flow to be passed through the interior of the substrate tube, which pre-treatment is carried out on the gas flow to be supplied to the interior of the substrate tube. It desirable that said pre-treatment be selected from the group consisting of pre-heating and pre-plasma, or a combination thereof. The device for carrying out the pre-treatment preferably does not surround the substrate tube, more in particular, the device for carrying out the pre-treatment is positioned outside the means for heating the substrate tube, in particular the furnace.

The present invention will now be explained in more detail by means of a number of examples, in which regard it should be noted, however, that the present invention is by no means limited to such special examples.

Figure 1:
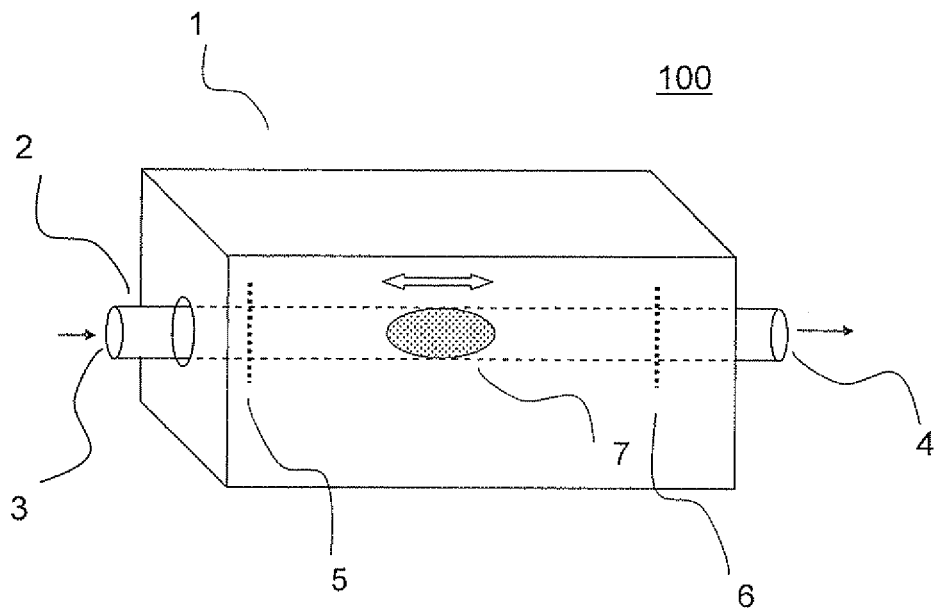
FIG. 1 is a schematic representation of a device for carrying out an internal vapour deposition process.

In FIG. 1 a device 100 for carrying out an internal vapour deposition process, in particular of the PCVD type, for manufacturing a primary preform for optical fibres is schematically shown. The device 100 comprises a furnace 1, which surrounds at least part of the hollow glass substrate tube 2. The hollow glass substrate tube 2 has a supply side 3 and a discharge side 4. The supply side 3 and the discharge side 4 can be positioned between a gas inlet and a gas outlet, respectively (not shown). The supply side 3 and the discharge side 4 can be clamped down, for example using a cylindrical passage provided with an O-ring seal, so that the internal volume of the hollow glass substrate tube 2 is isolated from the outside atmosphere on the outer side thereof. Such a construction makes it possible to carry out the deposition process at a reduced pressure when a pump (not shown) is connected to the gas inlet.

FIG. 1 further schematically shows a reaction zone 7, which reaction zone 7 moves back and forth during the internal vapour deposition process between a reversal point 5 located near the supply side 3 and a reversal point 6 located near the discharge side 4. The deposition length is to be regarded as the distance between the two reversal points, viz. the length along which the glass layers are deposited on the inner side of the hollow glass substrate tube 2. The two reversal points are surrounded by the furnace 1.

During the internal vapour deposition process, doped or undoped glass-forming gases are supplied via the supply side 3 of the hollow glass substrate tube 2, which glass-forming gases are converted into glass in the reaction zone 7. Using the back-and-forth movement of the reaction zone 7, a number of glass layers are thus deposited one on top of the other on the inner side of the hollow glass substrate tube 2.

The present invention is in particular suitable for use in an internal vapour deposition process of the PCVD type, in which microwaves are coupled in the interior of the hollow glass substrate tube via a resonance cavity, also called resonator, which partially surrounds the hollow glass substrate tube, seen in the longitudinal direction thereof, so as to form a local plasma. The term "local plasma" is understood to mean a plasma having a length which more or less corresponds to the length of the resonator, both seen in the longitudinal direction of the hollow glass substrate tube 2. In a PCVD process, the resonance space is moved back and forth along the length of the hollow glass substrate tube between the two reversal points 5, 6. After completion of the present method, a collapsing process can be carried out, in which the hollow glass substrate tube is formed into a solid preform. A solid glass rod thus obtained may be externally provided with an additional amount of glass. Subsequently, the final optical fibre is obtained by heating the solid preform, which may or may not be provided with additional glass layers, at one end thereof, whereupon a fibre is drawn therefrom, which fibre may be provided with one or more coatings prior to being wound on a reel.

A PCVD process is known in the art, for example from U.S. patent applications published under Nos. U.S. 2005/0000253, U.S. 2008/0044150, U.S. 2005/0120751, U.S. 2008/0053812, U.S. 2005/0041943 and U.S. Pat. Nos. 4,741,747 and 4,493,721.

Resonators are known in the art, for example from U.S. patent applications published under Nos. U.S. 2007/0289532, U.S. 2003/0159781 en U.S. 2005/0172902, and U.S. Pat. Nos. 4,844,007, 4,714,589 and 4,877,938.

The PCVD process is a so-called low-pressure process, which means that the pressure during the internal vapour deposition process is set a value in the 1-40 mbar range, preferably in the 5-30 mbar range.

Figure 2:
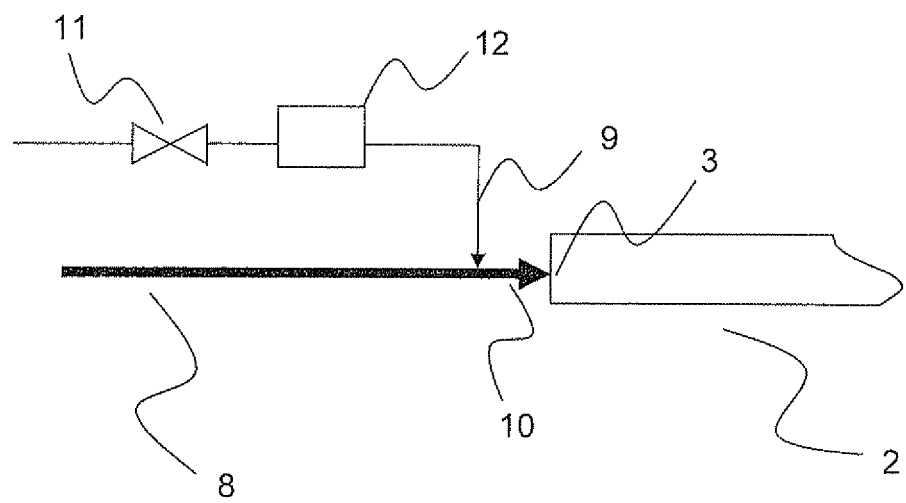
FIG. 2 is a schematic representation of a special preferred device for implementing the present invention.

FIG. 2 schematically shows the present invention, in which a gas flow 10 is supplied to the interior of the hollow substrate tube 2 via the supply side 3 of the substrate tube 2. In FIG. 2, the furnace and the reaction zone 7, as well as the reversal points 5, 6, are not shown for the sake of clarity. FIG. 2 shows that the pre-treatment in the device 12 clearly takes place at a position outside the substrate tube 2. The gas flow 10 can be regarded as a combination of a main gas flow 8 and one or more secondary gas flows 9, wherein the flow rate of the main gas flow 8 is preferably higher the flow rate of each individual one of said one or more secondary gas flows 9. The main gas flow is composed of, for example, $SiCl_4$ and $O_2$. Although only one secondary gas flow 9 is shown in FIG. 2, it will be apparent that there may be several secondary gas flows 9. Disposed in the secondary gas flow 9 is a device 12 for carrying out a pre-treatment. Furthermore, a valve 11 is disposed in the secondary gas flow 9. If the device 12 carries out a pre-plasma treatment on the secondary gas flow 9, which secondary gas flow 9 contains $C_2F_6$ as a dopant, for example, in the presence of oxygen, for example, the fluorine atoms present in the secondary gas flow 9 are pre-activated in such a manner that a premature reaction with the hydrogen atoms present in the hollow substrate tube 2 takes place in the hollow substrate tube 2 after the entry of the gas flow 10, which consists of a combination of the main gas flow 8 and said one or more secondary gas flows 9. Such a combination of gas flows 9, 10 is a simple step of mixing and does not constitute a pre-treatment in the meaning of the present invention. Other dopants can be supplied via other secondary gas flows 9 (not shown), which secondary gas flows may also undergo a pre-treatment according to the present invention. Because of the presence of the fluorine atoms, which have already been slightly pre-activated, the reaction with the hydrogen present in the plasma can take place substantially instantaneously so as to form the stable HF. The possible incorporation of fluorine in the glass layers to be deposited in the interior of the substrates tube 2 thus decreases, as a result of which the amount of fluorine incorporated in the glass layers will be minimised. Consequently, the amount of germanium to be supplied to the hollow substrate tube 2, which germanium functions as compensation for the refractive index-decreasing fluorine, is smaller than in an embodiment in which such a pre-treatment via the device 12 does not take place. Although the device 12 is indicated as a pre-treatment of the pre-plasma type in FIG. 2, it will be understood that a pre-treatment of the heating type may also be carried out. Furthermore it is possible to arrange a number of devices 12 in series, in which case the pre-treatment can be selected from pre-plasma and/or heating.

The composition of the secondary gas flow 9 must be selected so that no premature deposition of, for example, carbon will take place in the device 12. Precipitation of carbon could take place as a result of, for example, a reaction between oxygen and, for example, $C_2F_6$. In order to effect a gradual transition between the plasma conditions prevailing in the device 12 and the plasma conditions prevailing in the hollow substrate tube 2, it is desirable that the power used in the reaction zone in the substrate tube 2 be higher than the power used in the device 12. In addition to that it is desirable that the distance between the device 12 and the interior of the substrate tube 2 be kept as small as possible so as to limit any loss of activity resulting from the pre-treatment being carried out.

Figure 3:
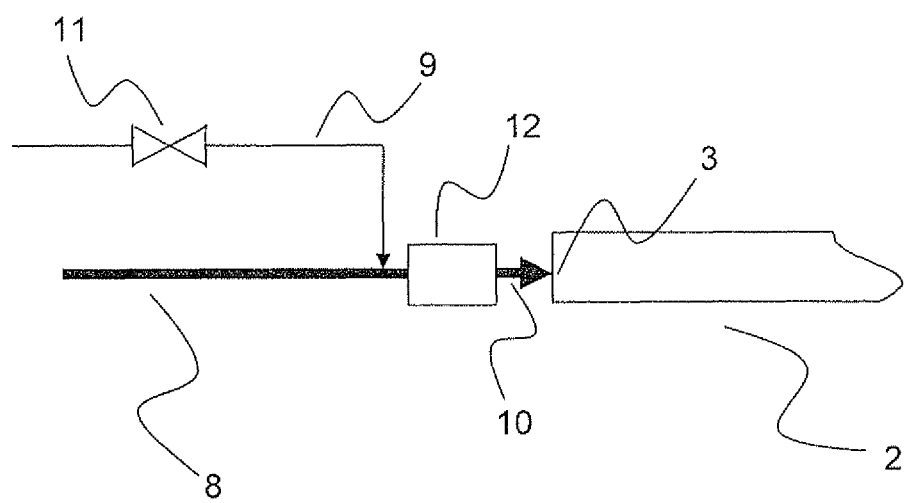
FIG. 3 is a schematic representation of a device suitable for implementing the present invention.

FIG. 3 schematically shows a second embodiment of the present invention, in which the same reference numerals are used as in FIG. 2. In FIG. 3 the device 12, in which the pre-treatment takes place, is disposed in the gas flow 10, which gas flow 10 can be regarded as more or less a combination of one or more secondary gas flows 9 and the main gas flow 8. The embodiment shown in FIG. 3 is in particular suitable if the device 12 comprises a pre-treatment of the pre-heating type, but it is also possible to use a pre-treatment of the pre-plasma type (not shown). According to a special embodiment it is desirable that a temperature of at least 800° C. prevails in the device 12 before the gas enters the hollow substrate tube 2, which hollow substrate tube 2, as shown in FIG. 1, is surrounded by a furnace in which the temperature of about 1200-1400° C. prevails. The elevated entry temperature of the gas flow 10, which consists of one or more secondary gas flow 9 and the main gas flow 8, causes the fluorine compounds present in the glass-forming gases to react with hydrogen upon entering the hollow substrate tube 2, whereupon the stable HF-compounds are formed. The furnace surrounding the substrate tube 2 and the plasma conditions prevailing in the substrate tube 2 effect reaction conditions such that deposition of one or more glass layers on the interior of the substrate tube 2 can take place, which glass layers exhibit a decreased OH-peak at 1385 nm.

Although it is indicated in FIG. 2 that the device 12 only applies for the secondary gas flow 9, it is also possible in a special embodiment to subject the main gas flow 8 to a pre-treatment, for example a pre-heating or a pre-plasma treatment, which may or may not take place in combination with a pre-treatment of one or more secondary gas flows 9. Furthermore it is possible in a special embodiment to apply the pre-treatment to a combination of one or more of secondary gas flow 9, main gas flow 8, or gas flow 10, with the type of pre-treatment not being limited to one type, but combinations being possible. The conditions in the device 12 must be selected so that premature deposition of undesirable compounds be minimised. In FIG. 2 and FIG. 3 the device 12 is disposed outside the substrate tube 2, more in particular, the device 12 does not surround the substrate 2 therein.

According to another embodiment (not shown) it is also possible to supply the main gas flow via a centrally positioned tube into the interior of the hollow substrate tube. The annular space between said tube and the hollow substrate tube is used for the supply of the secondary gas flow. The construction of these two tubes is surrounded by a stationair positioned resonant cavity for providing microwaves to the substrate tube. Such a stationair positioned resonant cavity is positioned at the supply side of the substrate tube and located outside the furnace. Such a pre-treatment can be regarded as another embodiment of the present invention. In such a construction the annular space can be used for the supply of the main gas flow, and the centrally positioned tube for the supply of the secondary gas flow. In another embodiment (not shown) the resonant cavity is replaced by a heating device.

The invention claimed is:

1. A method for manufacturing a primary preform for optical fibres, using an internal vapour deposition of a PCVD-type, comprising:
   supplying a gas flow of doped and/or undoped glass-forming gases to an interior of a hollow substrate tube having a supply side and a discharge side via the supply side; and
   depositing glass layers on a portion of the interior of the substrate tube that is surrounded by a furnace such that glass layer deposition is effected as a result of the presence of a reaction zone of a plasma type;
   wherein:
   the gas flow of doped and/or undoped glass-forming gases being supplied to the interior of the substrate tube comprises a main gas flow and a secondary gas flow, a flow rate of the main gas flow is higher than a flow rate of the secondary gas flow,
   the secondary gas flow comprises oxygen and a fluorine-containing compound free from hydrogen atoms, and
   of the gas flow of doped and/or undoped glass-forming gases being supplied to the interior of the substrate tube, only the secondary gas flow is subjected to a pretreatment step of a pre plasma type prior to being supplied to entry in the interior of the hollow glass substrate tube to minimize the incorporation of OH- groups in the deposited glass.

2. A method according to claim 1, wherein the fluorine-containing compound free from hydrogen atoms is selected from the group consisting of $CF_4$, $C_2F_6$, $C_4F_8$, $CCl_2F_2$, $SiF_4$ $Si_2F_6$, $SF_6$, $NF_3$, $F_2$ or a mixture thereof.

3. A method according to claim 2, further comprising
   subjecting the gas flow of doped and/or undoped glass-forming gases to a pre-heating step being carried out at a temperature of at least 800° C., and
   after the pre-heating step, heating the gas flow in the furnace to a temperature ranging from 1200° C. to 1400° C., wherein:

the pre-treatment step temperature is less than the temperature used in the heating step.

4. A method according to claim 3, wherein the pre-treatment is not carried out in the substrate tube.

5. A method according to claim 1, wherein the reaction zone is moved back and forth along the length of the hollow substrate tube during at least part of the deposition process.

6. A method according to claim 1, wherein the power level used for the plasma type is higher than the power level for the pre-plasma treatment.

7. A method according to claim 1, wherein the pre-plasma and plasma are generated using microwaves.

8. A method according to claim 1, wherein the power level of the pre-treatment of the pre-plasma type is set in dependence on the position of the reaction zone on the hollow glass substrate tube.

9. A method according to claim 1, wherein the power level used in the pre-treatment of the pre-plasma type is set in dependence on the period of the deposition process.

10. A method according to claim 1, wherein the pre-treatment is not carried out in the substrate tube.

11. A method for manufacturing an optical fibre by heating a preform obtained by using a method according to claim 1 at one end and subjecting the thus heated end to a drawing treatment so as to obtain the optical fibre.

* * * * *

UNITED STATES PATENT AND TRADEMARK OFFICE
CERTIFICATE OF CORRECTION

PATENT NO. : 8,667,816 B2
APPLICATION NO. : 13/150859
DATED : March 11, 2014
INVENTOR(S) : Igor Milicevic, Mattheus Jacobus Nicolaas Van Stralen and Eugen Aldea It is certified that error appears in the above-identified patent and that said Letters Patent is hereby corrected as shown below:

In the Claims:

In Column 8, Line 64, remove the extra "." after 800[degrees] C.

In Column 8, Line 66, remove the extra "." after 1200° C and after 1400° C.

Signed and Sealed this
Twentieth Day of May, 2014

Michelle K. Lee
*Deputy Director of the United States Patent and Trademark Office*